US012718829B2

(12) United States Patent
Elgee et al.

(10) Patent No.: US 12,718,829 B2
(45) Date of Patent: Aug. 25, 2026

(54) SYSTEMS AND METHODS FOR VOICE RECEPTION AND DETECTION

(71) Applicant: Indian Motorcycle International, LLC, Medina, MN (US)

(72) Inventors: Steven B. Elgee, Portland, OR (US); Jonathan G. Enz, Vancouver, WA (US)

(73) Assignee: POLARIS INDUSTRIES INC., Medina, MN (US)

( * ) Notice: Subject to any disclaimer, the term of this patent is extended or adjusted under 35 U.S.C. 154(b) by 301 days.

(21) Appl. No.: 17/918,822

(22) PCT Filed: Apr. 19, 2021

(86) PCT No.: PCT/US2021/027903
§ 371 (c)(1),
(2) Date: Oct. 13, 2022

(87) PCT Pub. No.: WO2021/216414
PCT Pub. Date: Oct. 28, 2021

(65) Prior Publication Data

US 2023/0352037 A1 Nov. 2, 2023

Related U.S. Application Data

(60) Provisional application No. 63/012,814, filed on Apr. 20, 2020.

(51) Int. Cl.
*G10L 25/78* (2013.01)
*B62J 45/10* (2020.01)
(Continued)

(52) U.S. Cl.
CPC ........... *G10L 21/0208* (2013.01); *B62J 45/10* (2020.02); *G10L 25/78* (2013.01); *H04R 1/326* (2013.01);
(Continued)

(58) Field of Classification Search
CPC ................. G10L 21/0208; G10L 25/78; G10L 2021/02166; B62J 45/10; H04R 1/326;
(Continued)

(56) References Cited

U.S. PATENT DOCUMENTS 7,676,204 B2 * 3/2010 Su .......................... H03G 3/345 455/296
10,609,475 B2 * 3/2020 Benattar .......... G10K 11/17881
(Continued)

FOREIGN PATENT DOCUMENTS

CN 103208286 7/2013
CN 103716733 A 4/2014
(Continued)

OTHER PUBLICATIONS

International Preliminary Report on Patentability received for PCT Patent Application No. PCT/US2021/027903, mailed on Nov. 3, 2022, 8 pages.
(Continued)

*Primary Examiner* — Daniel C Washburn
*Assistant Examiner* — Penny L Caudle
(74) *Attorney, Agent, or Firm* — SCHWEGMAN LUNDBERG & WOESSNER, P.A.

(57) ABSTRACT

Systems and methods for voice reception and detection related to a communication system are disclosed.

24 Claims, 5 Drawing Sheets

(51) Int. Cl.
*G10L 21/0208* (2013.01)
*H04B 1/3822* (2015.01)
*H04R 1/32* (2006.01)
*G10L 21/0216* (2013.01)

(52) U.S. Cl.
CPC ............... *G10L 2021/02166* (2013.01); *H04R 2410/07* (2013.01)

(58) Field of Classification Search
CPC ................ H04R 2410/07; H04R 1/086; H04R 2430/20; H04R 2499/13; H04B 1/3822
See application file for complete search history.

(56) References Cited

U.S. PATENT DOCUMENTS

| | | | | |
|---|---|---|---|---|
| 2003/0007649 | A1* | 1/2003 | Riggs ............... | H04N 21/42204 381/86 |
| 2004/0143373 | A1 | 7/2004 | Ennis | |
| 2013/0185066 | A1* | 7/2013 | Tzirkel-Hancock ......................... | G10L 21/003 381/71.4 |
| 2014/0093087 | A1 | 4/2014 | Kikuchi et al. | |
| 2017/0168467 | A1 | 6/2017 | Liu et al. | |
| 2017/0334500 | A1 | 11/2017 | Jarek et al. | |
| 2018/0261217 | A1 | 9/2018 | Mitra et al. | |
| 2019/0111940 | A1 | 4/2019 | Kinuhata | |
| 2019/0221595 | A1 | 7/2019 | Lee et al. | |

FOREIGN PATENT DOCUMENTS

| | | | |
|---|---|---|---|
| CN | 108352167 | A | 7/2018 |
| CN | 109196573 | A | 1/2019 |
| CN | 210133236 | U | 3/2020 |
| DE | 102018216281 | | 3/2020 |
| JP | 2001-222792 | A | 8/2001 |
| JP | 2001-287681 | A | 10/2001 |
| WO | 2021216414 | | 10/2021 |

OTHER PUBLICATIONS

Invitation to Pay Additional Fees received for PCT Patent Application No. PCT/US2021/027903, mailed on Jun. 28, 2021, 2 pages.

International Search Report and Written Opinion as issued by the International Searching Authority, dated Sep. 9, 2021, for International Patent Application No. PCT/US21/27903; 10 pages.

Ryan, "Harley Wireless Boom! Box voice Recognition Microphone-7 Pin Connector-Does it work?", Feb. 2, 2016, pp. 1-4.

"Japanese Application Serial No. 2022-562292, Notification of Reasons for Refusal mailed Jan. 28, 2025", with English translation, 11 pages.

"Chinese Application Serial No. 202180029634.8, Office Action mailed Dec. 7, 2024", with English translation, 15 pages.

"Chinese Application Serial No. 202180029634.8, Response filed Apr. 1, 2025 to Office Action mailed Dec. 7, 2024", with English claims, 19 pages.

"Japanese Application Serial No. 2022-562292, Response filed Apr. 21, 2025 to Notification of Reasons for Refusal mailed Jan. 28, 2025", with English claims, 19 pages.

"Chinese Application Serial No. 202180029634.8, Office Action mailed Jun. 20, 2025", with English translation, 28 pages.

"Japanese Application Serial No. 2022-562292, Notification of Reasons for Refusal mailed Jun. 17, 2025", with English translation, 5 pages.

"Chinese Application Serial No. 202180029634.8, Response filed Aug. 20, 2025 to Office Action mailed Jun. 20, 2025", With English Machine Translation, 37 pgs.

"Chinese Application Serial No. 202180029634.8, Office Action mailed Nov. 28, 2025", W English Translation, 28 pgs.

"European Application Serial No. 21792914.0, Extended European Search Report mailed Jun. 17, 2024", 11 pgs.

"Chinese Application Serial No. 202180029634.8, Response filed Jan. 30, 2026 to Consultation by Telephone", w/ English Claims, 9 pgs.

"European Application Serial No. 21792914.0, Response filed Jan. 30, 2026 to Extended European Search Report mailed Jun. 17, 2024", 23 pgs.

"Japanese Application Serial No. 2022-562292, Response filed Apr. 23, 2026 to Notification of Reasons for Refusal mailed Jan. 27, 2026", w English claims, 9 pgs.

"European Application Serial No. 21792914.0, Communication Pursuant to Article 943 EPC mailed May 27, 2026", 8 pgs.

* cited by examiner

COMPUTING DEVICE
360

WEARABLE DEVICE(S)
330

RECREATIONAL VEHICLE
340

NETWORK
350

WEARABLE DEVICE
302

COMMUNICATION SYSTEM
310

PROCESSOR
312

MEMORY
314

I/O 316

MEMORY UNIT
318

USER INTERFACE
320

SPEAKER(S)
322

MICROPHONE(S)
324

ACCELEROMETER
326

DATABASE
328

SYSTEMS AND METHODS FOR VOICE RECEPTION AND DETECTION

RELATED APPLICATION

This application claims the priority of International PCT Application No. PCT/US2021/027903, filed Apr. 19, 2021, titled SYSTEMS AND METHODS FOR VOICE RECEPTION AND DETECTION, which claims the priority of U.S. Provisional Application No. 63/012,814, filed Apr. 20, 2020, titled SYSTEMS AND METHODS FOR VOICE RECEPTION AND DETECTION, the entire disclosures of which are expressly incorporated by reference herein. This application is related to U.S. Provisional Application No. 63/012,811, filed Apr. 20, 2020, titled SYSTEMS AND METHODS FOR COMMUNICATING INFORMATION, the entire disclosure of which is expressly incorporated by reference herein.

TECHNICAL FIELD

The present disclosure relates generally to a communication system and, more particularly, to a communication system having a microphone for voice reception and/or detection.

BACKGROUND

Recreational vehicles, such as motorcycles, or off-road vehicles such as all-terrain vehicles (ATVs) and snowmobiles, are widely used for recreational purposes. During rides, users (e.g., drivers/riders) may control some features of the recreational vehicles via voice commands and/or may participate in telephone or radio communications. To do so, a user (e.g., a driver/rider) of a recreational vehicle may wear a wearable device with one or more microphones (e.g., a headset or a helmet with a microphone) to capture user's voice or speech. However, it is inevitable that the microphones also capture noise (e.g., engine noise, road noise, wind) in addition to the voice of the user.

SUMMARY

As set forth above, embodiments provided herein relate to voice capture for a recreational vehicle. Exemplary embodiments include but are not limited to the following examples.

In one aspect, a recreational vehicle is provided. The recreational vehicle includes a frame, front and rear ground-engaging members supporting the frame, a powertrain drivingly coupled to one of the front and rear ground-engaging members, a steering assembly coupled to the front ground-engaging member for steering the recreational vehicle, a seat supported by the frame, and a communication system. The communication system has a microphone positioned between the seat and the steering assembly.

In some embodiments, the recreational vehicle may further include a fuel tank that is supported by the frame and is positioned between the seat and the steering assembly. The microphone may be mounted on top of the fuel tank.

In some embodiments, the recreational vehicle may further include an airbox that is supported by the frame and is positioned between the seat and the steering assembly. The microphone may be mounted on top of the airbox.

In some embodiments, the communication system may be configured to receive a voice of a user of the recreational vehicle via the microphone.

In some embodiments, the steering assembly may further include a front fairing and user grips. In such embodiments, the microphone may be positioned behind the front fairing and below the user grips to reduce an amount of wind that comes in contact with the microphone.

In some embodiments, the microphone may be mounted in an angle, facing upwardly toward a user of the recreational vehicle, to reduce an amount of exhaust noise and/or engine noise.

In other aspect, a wearable device for voice detection is provided. The wearable device has a communication system, which includes a processor, a microphone configured to generate audio data of a voice of a user of the wearable device, an accelerometer configured to generate accelerometer data capturing vibrations of the user's head and/or neck, and memory comprising instructions that when executed by the processor cause the processor to detect the voice of the user using the accelerometer data.

In some embodiments, to generate the audio data may include to generate audio data of the voice of the user in response to a detection the voice of the user.

In some embodiments, to detect the voice of the user using he accelerometer data may include to detect the voice of the user by correlating the audio data to the accelerometer data.

In some embodiments, the microphone may be coupled to the wearable device near the user's mouth to receive the voice from the user.

In some embodiments, the accelerometer may be coupled to the wearable device at a position where the wearable device is likely to be in contact with the user's head and/or neck to detect audio frequencies produced by user's vocal cords in real time.

In some embodiments, the wearable device may be a helmet.

In some embodiments, the accelerometer may be positioned on a chinstrap of the wearable device.

In some embodiments, the memory may further include instructions that when executed by the processor cause the processor to: process the audio data using a beamforming technique to achieve spatial selectivity, filter the processed audio data to remove low frequency noise, and filter the accelerometer data to remove high frequency noise. In some embodiments, to detect the voice of the user using he accelerometer data may include to detect the voice of the user by correlating the filtered processed audio data and the filtered accelerometer data to detect the voice of the user.

In some embodiments, the communication system may further include a low pass filter that is configured to receive the accelerometer output signals generated by the accelerometer to remove high frequency noise.

In some embodiments, the communication system may further include a high pass filter that is configured to receive the audio output signals generated by the microphones to remove low frequency noise.

In other aspect, a method for voice detection is provided. The method includes generating accelerometer data capturing vibrations of the user's head and/or neck via an accelerometer of the wearable device, and detecting a voice of the user using the accelerometer data.

In some embodiments, the method may further include generating, in response to detecting the voice of the user, audio data of the voice of the user via a microphone of the wearable device.

In some embodiments, the method may further include generating audio data of the voice of the user via a microphone of the wearable device, wherein detecting the voice of the user using the accelerometer data comprises detecting the voice of the user by correlating the audio data to the accelerometer data.

In some embodiments, the microphone may be coupled to the wearable device near the user's mouth to receive the voice from the user.

In some embodiments, the accelerometer may be coupled to the wearable device at a position where the wearable device is likely to be in contact with the user's head and/or neck to detect audio frequencies produced by user's vocal cords in real time.

In some embodiments, the wearable device may be a helmet.

In some embodiments, the accelerometer may be positioned on a chinstrap of the wearable device.

In some embodiments, the method may further includes processing the audio data using a beamforming technique to achieve spatial selectivity, filtering the processed audio data to remove low frequency noise, and filtering the accelerometer data to remove high frequency noise. In some embodiments, detecting the voice of the user may include detecting the voice of the user by correlating the filtered processed audio data and the filtered accelerometer data to detect the voice of the user.

In one aspect, a communication system for noise processing is provided. The communication system includes a processor, and memory comprising instructions that when executed by the processor cause the processor to: receive audio data including a voice of a user via a microphone, process the audio data to remove unwanted ambient sound based on current vehicle information of a recreational vehicle of the user, and output processed audio data.

In some embodiments, the predictable noise may include engine noise that is generated based on a state of an engine of the recreational vehicle that the user is riding.

In some embodiments, the unpredictable noise may include road noise, wind noise, and/or any other environment noise In some embodiments, the microphone may be mounted on the recreational vehicle.

In some embodiments, the microphone may be mounted on a wearable device of the user.

In some embodiments, to process the audio data may include to remove a first set of noise from the audio data based on the current vehicle information, wherein the current vehicle information includes a type, model, and/or make of the recreational vehicle, a vehicle noise profile associated with the recreational vehicle, and/or a current state of an engine of the recreational vehicle.

In some embodiments, the current state of an engine of the recreational vehicle may include any current state of the engine parameters, and the vehicle noise profile is generated based on the engine parameters of the recreational vehicle.

In some embodiments, the engine parameters may include an engine phase, an engine speed, a transmission gear, a clutch position, a throttle position, and a wheel speed.

In some embodiments, to process the audio data may include to remove a second set of noise from the audio data using a moving average filter.

In other aspect, a method for noise processing is provided. The method includes receiving audio data including a voice of a user via a microphone, processing the audio data to remove unwanted ambient sound based on current vehicle information of a recreational vehicle of the user, and outputting processed audio data.

In some embodiments, the predictable noise may include engine noise that is generated based on a state of an engine of the recreational vehicle that the user is riding.

In some embodiments, the unpredictable noise may include road noise, wind noise, and/or any other environment noise In some embodiments, the microphone may be mounted on the recreational vehicle.

In some embodiments, the microphone may be mounted on a wearable device of the user.

In some embodiments, processing the audio data may include removing a first set of noise from the audio data based on the current vehicle information, wherein the current vehicle information includes a type, model, and/or make of the recreational vehicle, a vehicle noise profile associated with the recreational vehicle, and/or a current state of an engine of the recreational vehicle.

In some embodiments, the current state of an engine of the recreational vehicle may include any current state of the engine parameters, and the vehicle noise profile is generated based on the engine parameters of the recreational vehicle.

In some embodiments, the engine parameters may include an engine phase, an engine speed, a transmission gear, a clutch position, a throttle position, and a wheel speed.

In some embodiments, processing the audio data may include removing a second set of noise from the audio data using a moving average filter.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Figure 1:
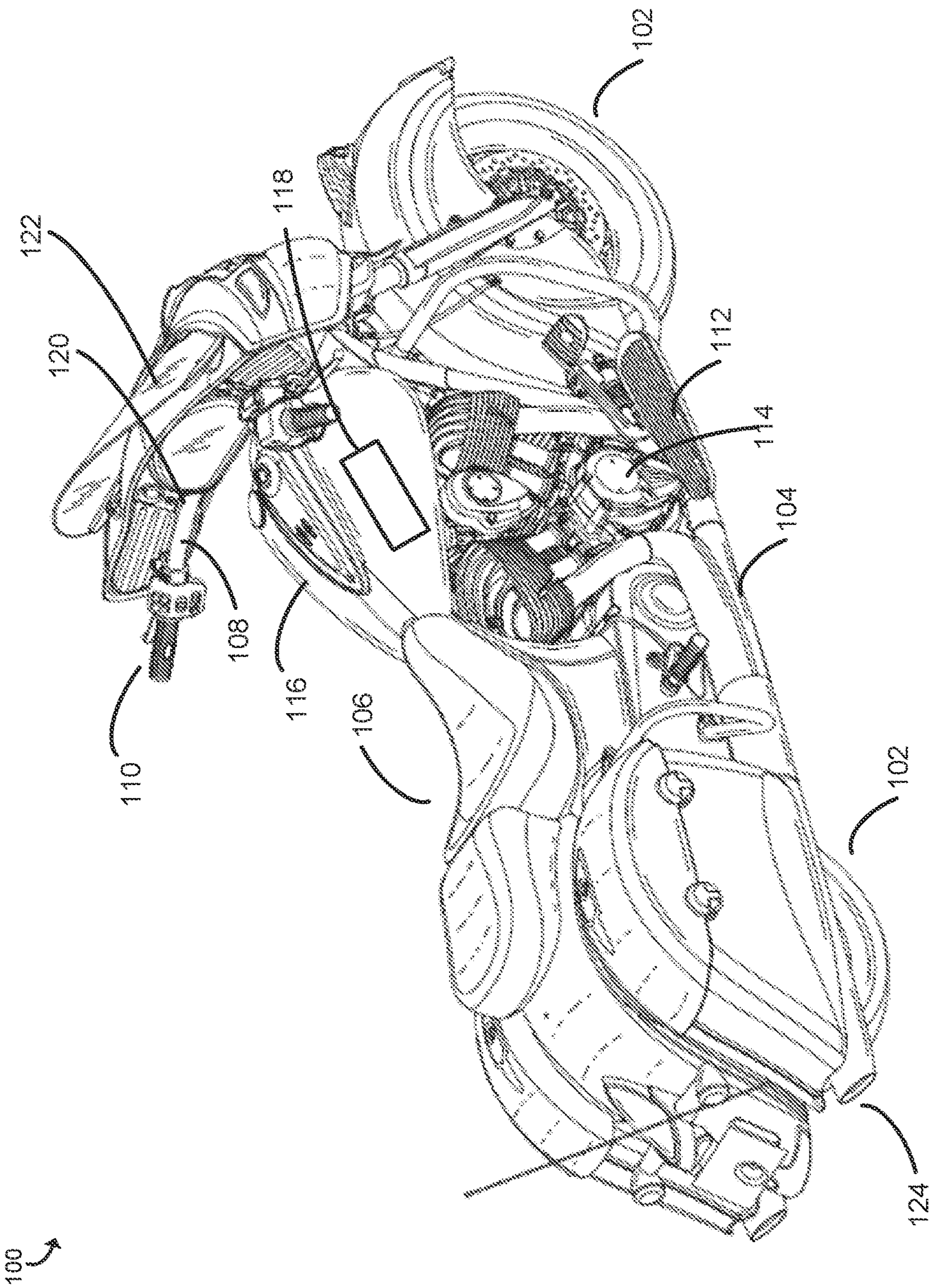
FIG. 1 is a side perspective view of a recreational vehicle in accordance with certain embodiments of the invention.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to FIG. 1, a recreational vehicle 100 embodied as a motorcycle is shown. It should be appreciated that, although the recreational vehicle 100 is illustrated as a motorcycle in FIG. 1, a recreational vehicle may be embodied as any off-road vehicle, such as an all-terrain vehicle (ATVs) and a snowmobile, that is widely used for recreational purposes. The recreational vehicle may include some features that are controllable by a user (e.g., a driver/rider) via voice commands. Additionally or alternatively, the user may wish to participate in telephone or radio communications while on the recreational vehicle. To do so, the illustrative recreational vehicle 100 has one or more microphones mounted directly on the recreational vehicle 100 to capture user's voice or speech without having to wear a wearable device, such as a headset or a helmet.

As shown in FIG. 1, the recreational vehicle 100 includes a plurality of ground engaging members 102. The ground engaging members 102 include wheels, treads, skis, and other suitable devices which support the vehicle 100 relative to the ground. The recreational vehicle 100 further includes a frame 104 supported by the plurality of ground engaging members 102. The front and/or rear wheels 102 are coupled to a powertrain assembly 114, to propel the vehicle 100 during operation thereof. Powertrain assembly 114 includes both an engine and a transmission. The transmission is coupled to the engine and provides power to the front and/or rear wheels 102.

A seat 106 is operatively supported by the frame 104. The seats 106 may include straddle seats, bench seats, bucket seats, and other suitable support members. In addition to the seat 106, the recreational vehicle 100 may further include a passenger seat. Illustrative passenger seats include straddle seats, bench seats, bucket seats, and other suitable support members. In some instances, the passenger seat is positioned directly rearward of the user seat. One or more floorboards 112 are supported by the frame 104. The vehicle floorboards 112 are adapted to support a lower portion of the user when the user is operating the vehicle 100. For example, when a user is sitting on the seat 106, the user may place their shoes, boots, and/or other accessories on the floorboards 112.

A steering system 120 is coupled to at least one of the ground engagement members 102 and generally includes a user input or steering member 108 adapted to be grasped by a user of the vehicle 100. The illustrative steering members 108 include handlebars and/or steering wheels. Additionally, and/or alternatively, the steering member 108 includes one or more user grips 110. An illustrative user grip 110 is a handgrip (e.g., a motorcycle handgrip).

Figure 2:
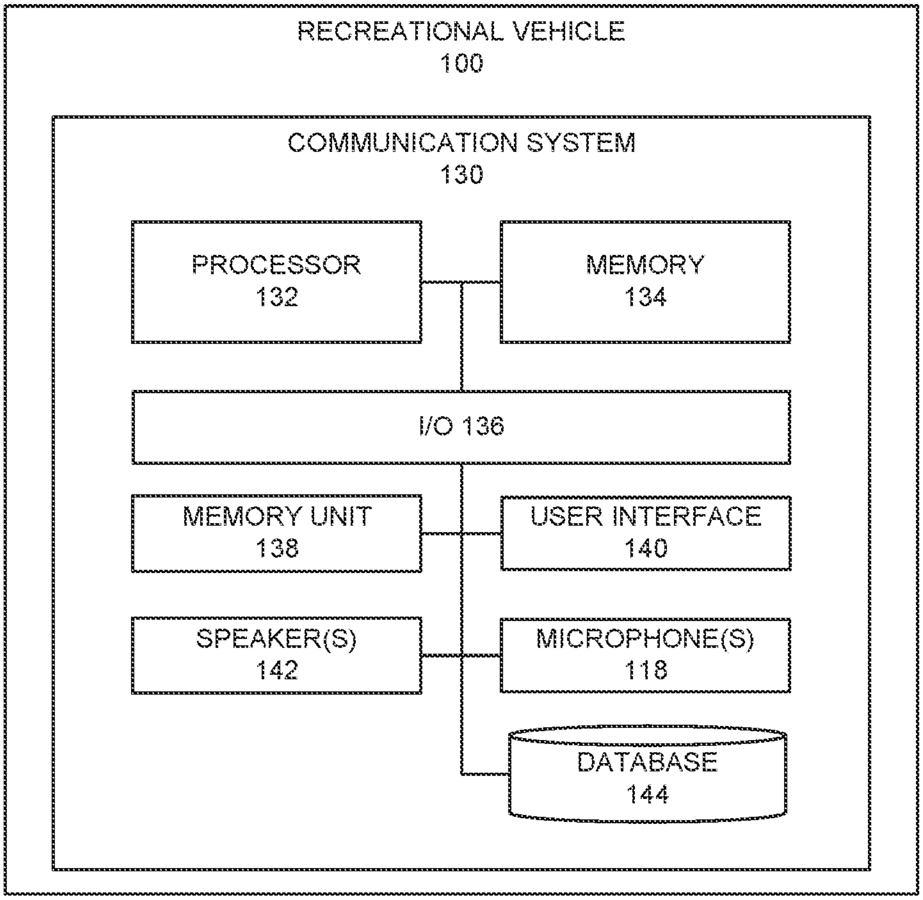
FIG. 2 illustrates a block diagram of a communication system of the recreational vehicle of FIG. 1.

The recreational vehicle 100 further includes a communication system 130, which is described in detail in FIG. 2. The communication system 130 includes a microphone 118 to capture the user's voice. In the illustrative embodiment, the microphone 118 is mounted on the recreational vehicle 100 between the steering system 120 and the seat 106 to capture the user's voice to activate voice commands and/or to participate in telephone or radio communications. To do so, the microphone 118 is mounted on the recreational vehicle 100 in a specific configuration to minimize noise (e.g., wind, engine noise, and road noise) that may be captured via the microphone 118. More specifically, the microphone 188 is configured to be positioned behind a front fairing 122 and below the user grips 110 to reduce an amount of wind that comes in contact with the microphone 188. Additionally, the microphone 118 is mounted in an angle, facing upwardly toward the user, to reduce an amount of engine noise and/or exhaust noise that may be captured from a muffler 124 at the rear of the recreational vehicle 100.

In the illustrative recreational vehicle 100, a fuel tank 116 is positioned between the steering system 120 and the seat 106, and the microphone 118 is positioned on top of the fuel tank 116. However, it should be appreciated that, depending on the recreational vehicle, a microphone may be positioned on top of an air box that is positioned between the steering system 120 and the seat 106. In other words, the microphone 118 is adapted to be mounted on an element that is positioned between the steering system 120 and the seat 106 of a recreational vehicle. It should also be appreciated that, although one microphone 118 is shown in FIG. 1, the communication system of the recreational vehicle may include multiple microphones that are mounted on the recreational vehicle to capture the voice of the user.

Referring now to FIG. 2, a block diagram of the recreational vehicle 100 having the communication system 130 is shown. In the illustrative embodiment, the communication system 130 of the recreational vehicle 100 includes a processor 132, a memory 134, an input/output (I/O) controller 136 (e.g., a network transceiver), a memory unit 138, an user interface 140, one or more speakers 142, and the microphone 118, all of which may be interconnected via one or more address/data bus. Although the I/O controller 136 is shown as a single block, it should be appreciated that the I/O controller 136 may include a number of different types of I/O components. The user interface 140 may include one or more input devices that can receive user input (e.g., buttons, a touch pad, a keyboard).

The processor 132 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the communication system 130) may be performed by one or more processors 132. The memory 134 may be a random-access memory (RAM), read-only memory (ROM), a flash memory, or any other suitable type of memory that enables storage of data such as instruction codes that the processor 132 needs to access in order to implement any method as disclosed herein. It should be appreciated that although only one processor 132 is shown, the communication system 130 may include multiple processors 132.

The communication system 130 may further include a database 144. As used herein, the term "database" may refer to a single database or other structured data storage, or to a collection of two or more different databases or structured data storage components. In the illustrative embodiment, the database 144 is part of the communication system 130. In some embodiments, the communication system 130 may access the database 144 via a network (not shown).

The communication system 130 may further include a number of software applications stored in memory unit 138, which may be called a program memory. The various software applications on the communication system 130 may include specific programs, routines, or scripts for performing processing functions associated with the methods described herein. Additionally or alternatively, the various software applications on the communication system 130 may include general-purpose software applications for data processing, database management, data analysis, network communication, web server operation, or other functions described herein or typically performed by a communication system of a recreational vehicle. The various software applications may be executed on the same computer processor or on different computer processors. Additionally, or alternatively, the software applications may interact with various hardware modules that may be installed within or connected to the communication system 130. Such modules may implement part of or all of the various exemplary method functions discussed herein or other related embodiments.

The one or more speakers 142 may be any electronic device that are capable of producing sound in response to an electrical audio signal input. For example, the communication system 130 may be communicatively coupled to a user's mobile device. In such cases, the electrical audio signal input may be received from the user's mobile device to, for example, deliver audio conversations during a phone call, play music, and/or play back a text message or email to the user via the one or more speakers 142. In other example, the communication system of the recreational vehicle 100 may be communicatively coupled to a communication system of another recreational vehicle. In such cases, the electrical audio signal input may be received from another user via a communication system of another recreational vehicle to deliver communications or messages from another user.

The microphone 118 may be any electronic device that is capable of capturing sound and converting into an electrical audio output signal. As described above, in the illustrative embodiment, the microphone 118 is mounted on the recreational vehicle 100 to capture the user's voice to activate voice commands and/or to participate in telephone or radio communications. The audio output signals from the microphone 118 may be transmitted to the user's mobile device during a phone call and/or to create a voice-to-text message or email to be sent to another computing device. Additionally, the audio output signals may be transmitted to a communication system of another communication system of a recreational vehicle of another user to deliver communications or message from the user to another user.

By having the microphone 118 directly on the recreational vehicle 100 as a part of the recreational vehicle's communication system 130 allows the user to avoid using a detached microphone that requires to be physically attached to the recreational vehicle 100 or be communicatively coupled to the recreational vehicle 100 (e.g., via Bluetooth). However, it should be appreciated that, in some embodiments, a microphone may be incorporated in a wearable device (e.g., a helmet) of user to capture the user's voice, as discussed in detail in FIG. 3.

Figure 3:
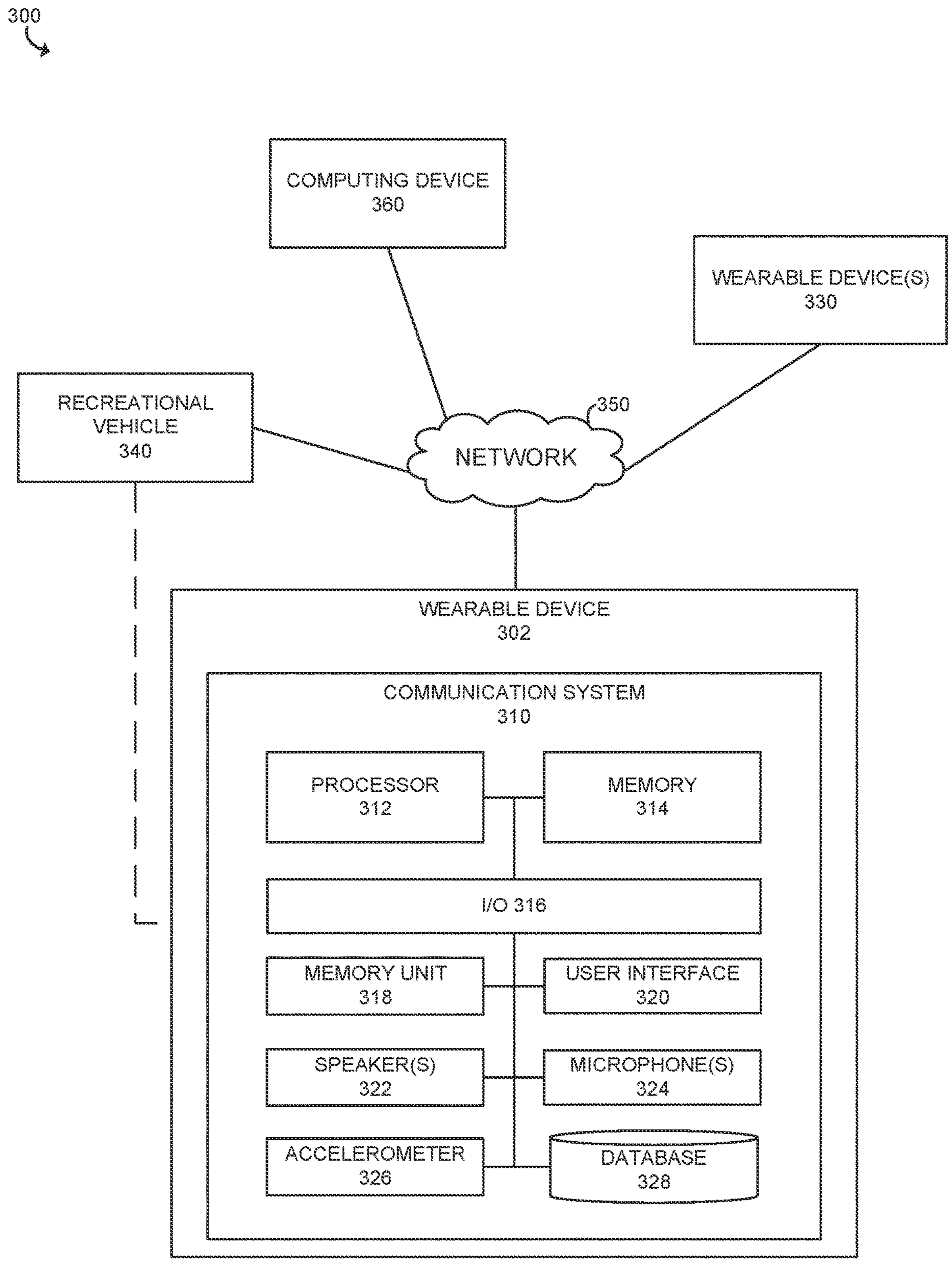
FIG. 3 illustrates a system for voice reception of a user including a wearable device of the user having a communication system, according to an example of the present disclosure.

Referring now to FIG. 3, a system 300 for detecting a voice of a user (e.g., a driver/rider) of a recreational vehicle 340 via a wearable device 302 (e.g., a helmet) is shown. The wearable device 302 is adapted to be worn by the user when riding the recreational vehicle 340 to detect user's voice or speech during the ride. Detecting user's voice using a microphone 324 coupled to the wearable device 302 during the ride may be challenging because of sensitivity of the microphone 324 to ambient sounds, such as engine noise, tire noise, and wind noise. To increase the efficiency and efficacy of voice reception, the illustrative wearable device 302 further includes an accelerometer 326, which is described in detail below.

In the illustrative embodiment, the system 300 includes the wearable device 302 having a communication system 310 that is communicatively coupled to the recreational vehicle 340 wirelessly (e.g., via Bluetooth or Wi-Fi). However, it should be appreciated that, in some embodiments, the wearable device 302 may be coupled to the recreational vehicle 340 via a wire. The system 300 may further include one or more wearable device 330 and/or one or more computing devices 360 (e.g., a mobile device, a server) that are communicatively coupled to the wearable device 302 via a network 350.

In the illustrative embodiment, the communication system 310 of the wearable device 302 includes a processor 312, a memory 314, an input/output (I/O) controller 316 (e.g., a network transceiver), a memory unit 318, an user interface 320, one or more speakers 322, one or more microphones 324, and an accelerometer 326, all of which may be interconnected via one or more address/data bus. Although the I/O controller 316 is shown as a single block, it should be appreciated that the I/O controller 316 may include a number of different types of I/O components. The user interface 320 may include one or more input devices that can receive user input (e.g., buttons, a touch pad, a keyboard).

The processor 312 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the communication system 310) may be performed by one or more processors 312. The memory 314 may be a random-access memory (RAM), read-only memory (ROM), a flash memory, or any other suitable type of memory that enables storage of data such as instruction codes that the processor 312 needs to access in order to implement any method as disclosed herein. It should be appreciated that although only one processor 312 is shown, the communication system 310 may include multiple processors 312.

The communication system 310 may further include a database 328. As used herein, the term "database" may refer to a single database or other structured data storage, or to a collection of two or more different databases or structured data storage components. In the illustrative embodiment, the database 328 is part of the communication system 310. In some embodiments, the communication system 310 may access the database 328 via a network (e.g., a network 350). The database 328 may store data that is received from and/or to be transmitted to one or more communication systems of other wearable devices 330, a computing device 340, one or more server(s) 360. It should be appreciated that each of other wearable devices 330 includes a communication system similar to the communication system 310 of the wearable device 302.

In general, the computing device 360 may include any existing or future devices capable of receiving and/or transmitting data to and from the user. For example, the computing device may be, but not limited to, a mobile device, a smartphone, a tablet, wearable, smart glasses, a computer, a notebook, a laptop, or any other suitable computing device that is capable of communicating with the communication system 310 of the wearable device 302. It should be appreciated that, in some embodiments, the computing device 360 may be directly coupled to the wearable device 302 via a wire.

The communication system 310 may further include a number of software applications stored in memory unit 318, which may be called a program memory. The various software applications on the communication system 310 may include specific programs, routines, or scripts for performing processing functions associated with the methods described herein. Additionally or alternatively, the various software applications on the communication system 310 may include general-purpose software applications for data processing, database management, data analysis, network communication, web server operation, or other functions described herein or typically performed by a communication system of a wearable device (e.g., a helmet). The various software applications may be executed on the same computer processor or on different computer processors. Additionally, or alternatively, the software applications may interact with various hardware modules that may be installed within or connected to the communication system 310. Such modules may implement part of or all of the various exemplary method functions discussed herein or other related embodiments.

The one or more speakers 322 may be any electronic devices that are capable of producing sound in response to an electrical audio signal input. In the illustrative embodiment, the speakers 322 are positioned near the user's ears to transmit audible sound to the user. If the wearable device 302 is embodied as a helmet, the speakers 322 may be positioned inside the helmet near the user's ears to transmit audible sound to the user. For example, the electrical audio signal input may be received from the recreational vehicle 340 via the one or more speaker 322 for voice commands, phone communications, and/or radio communications (e.g., vehicle-to-vehicle communications). In some embodiments, the electrical audio signal input may be directly received from a communication system of another wearable device (e.g., 330) to receive communications or messages from another user. In other embodiments the communication system 310 of the wearable device 302 may be communicatively coupled to a user's mobile device (e.g., the computing device 360). In such cases, the electrical audio signal input may be directly received from a user's mobile device (e.g., the computing device 360) to, for example, deliver audio conversations during a phone call, play music, and/or play back a text message or email to the user via the one or more speaker 322.

The one or more microphones 324 may be any electronic devices that are capable of capturing sound and converting into an electrical audio output signal. In the illustrative embodiment, the microphone 324 may be mounted near the user's mouth to receive audible sound from the user. If the wearable device 302 is embodied as a helmet, the microphone may be mounted outside and/or inside the helmet near the user's mouth. For example, the electrical audio output signals from the one or more microphones 324 may be transmitted to the recreational vehicle 340 for voice commands, phone communications, and/or radio communications (e.g., vehicle-to-vehicle communications). The electrical audio output signal may be transmitted directly to a communication system of another wearable device (e.g., 330) of another user to deliver communication or message from the user to another user. Additionally, in some embodiments, the communication system 310 may directly communicate with the user's mobile device (e.g., the computing device 340) for phone communications and/or for creating a voice-to-text message or email to be sent to another computing device.

The accelerometer 326 may be any sensor that is capable of measuring frequency vibration. In the illustrative embodiment, the accelerometer 326 is positioned where the wearable device 302 is likely to be in contact with the user's head and/or neck. This allows the accelerometer 326 to capture vibrations of the user's head and/or neck to detect a voice or speech of the user. For example, if the wearable device 302 is embodied as a helmet, the accelerometer is mounted or embedded on an interior surface of the helmet and is positioned where the cheek of the user is likely to hit when wearing the helmet. Alternatively or additionally, if the helmet has a headphone or earmuffs (e.g., a noise cancelling headphone or earmuffs) inside the helmet, the accelerometer may be mounted or embedded in a padding of the ear of the earmuffs. However, it should be appreciated that, in some embodiments, the accelerometer may be positioned anywhere insider the helmet where the helmet is in contact with the user's body (e.g., user's head, face, and/or neck). It should also be appreciated that, in some embodiments, the accelerometer 326 may be positioned on a chinstrap of the wearable device 302. By mounting the accelerometer 326 in the wearable device or on a chinstrap that is in contact with the user's head and/or neck, audio frequencies produced by the user's vocal cords may be detected in real time. The accelerometer signals are minimally affected by ambient audio noise, such as the engine noise. In one example, the accelerometer 326 may be embodied as a low-noise, high-bandwidth 3-axis accelerometer with a time-division multiplexing slave interface. In such an example, the signal bandwidth may be 2340 hertz, and the supply voltage may be between 1.71 and 1.99 voltage.

The network 350 is any suitable type of computer network that functionally couples the communication system 310 of the wearable device 302 with another wearable device 330, and/or the computing device 360. In some embodiments, the network 350 may be any suitable type of computer network that functionally couples the recreational vehicle 340 to one or more computing devices 360 and/or one or more wearable devices. The network 350 may include a proprietary network, a secure public internet, a virtual private network and/or one or more other types of networks, such as dedicated access lines, plain ordinary telephone lines, satellite links, cellular data networks, or combinations thereof. In embodiments where the network 350 comprises the Internet, data communications may take place over the network 350 via an Internet communication protocol.

The network 350 may be, or include, any number of different types of communication networks such as, for example, a bus network, a short messaging service (SMS), a local area network (LAN), a wireless LAN (WLAN), a wide area network (WAN), a personal area network (PAN), the Internet, a P2P network, custom-designed communication or messaging protocols, and/or the like. The network 350 may include a combination of multiple networks.

It should be appreciated that this diagram is merely an example, which should not unduly limit the scope of the claims. One of ordinary skill in the art would recognize many variations, alternatives, and modifications.

Figure 4:
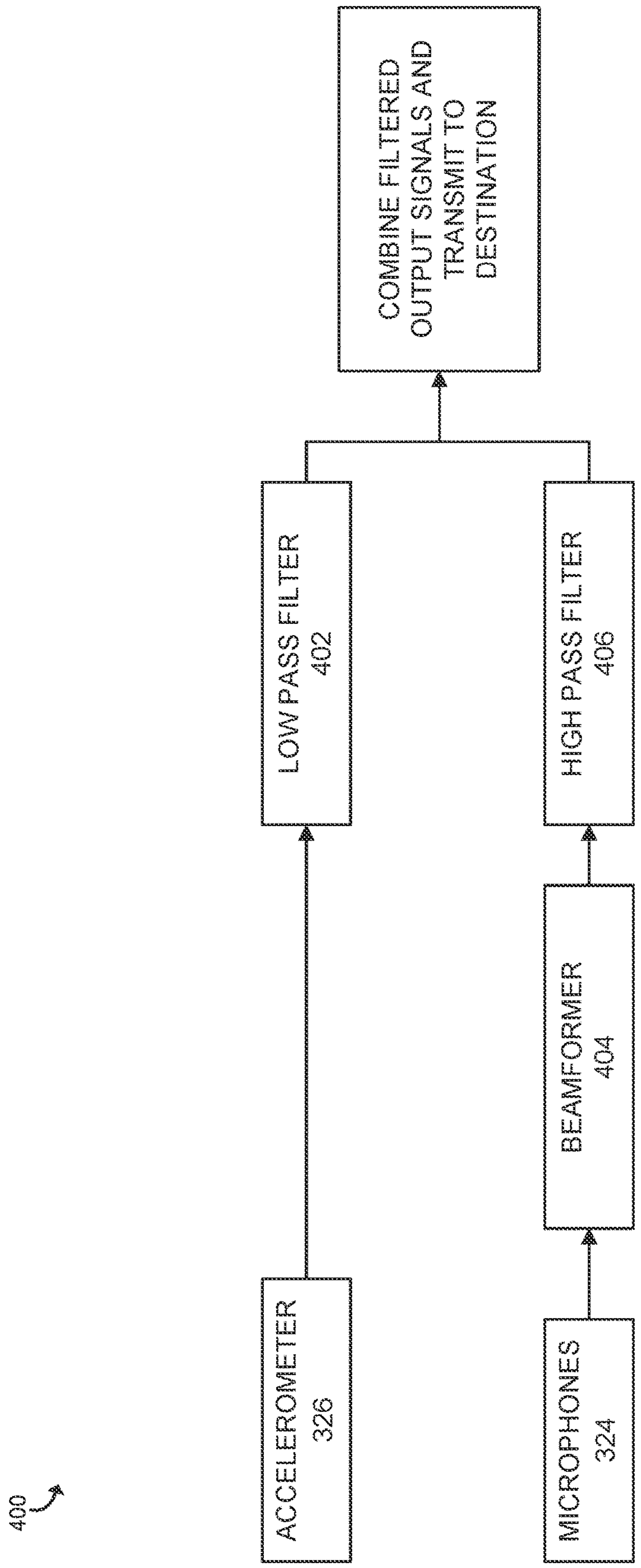
FIG. 4 illustrates a method for voice detection of the user using the wearable device of FIG. 3.

Referring now to FIG. 4, a computer-implemented method 400 for voice detection in the wearable device 302 using the accelerometer 326 and the microphones 324 is shown. In the illustrative embodiment, the method 400 is performed by the communication system 310 of the wearable device 302. As discussed above, detecting user's voice using a microphone coupled to a wearable device in a noisy environment may be challenging because of sensitivity of the microphone to ambient audio noise or environment noise, such as engine noise. However, unlike the audio output signal generated by the microphone, the accelerometer output signal is minimally affected by ambient audio noise since the accelerometer is configured to detect audio frequencies produced by the user's vocal cords in or near real-time. Based on the accelerometer data, the communication system 310 is able to detect whether the user is making sound and activates the microphone 324 to obtain the microphone data. In other words, the microphone 324 may be inactive or muted until the communication system 310 detects the voice or sound of the user. It should be appreciated that, in some embodiments, the microphone 324 may be always active. As such, the communication system 310 of the wearable device 302 utilizes the output signals from the microphones 324 and the accelerometer 326 of the wearable device 302 to detect a voice of the user more accurately.

As described above, the accelerometer 326 is configured to detect audio frequencies produced by the user's vocal cords in real-time. The detected frequencies can then be accentuated in the signal path of the microphones 324 to improve voice detection accuracy. In the illustrative embodiment, frequency detection and accentuation are done with standard digital signal processing techniques using a low pass filter 402, a beamforming 404, and a high pass filter 406. As shown in FIG. 4, the low pass filter 402 is connected to the accelerometer 326. Whereas, the high pass filter 406 is connected to the microphones 324 via a beamformer or a spatial filter 404.

The low pass filter 402 is configured to receive the accelerometer output signals generated by the accelerometer 326 to remove high frequency noise. In other words, the accelerometer data provides an audio representation of low frequencies of the voice of the user.

The high pass filter 406 is configured to receive the audio output signals generated by the microphones 324 of the wearable device 302 to remove low frequency noise (e.g., environment noise). To do so, the audio output signals from the microphones 324 are processed using a beamforming technique for directional signal reception to achieve spatial selectivity via the beamformer or spatial filter 404. It should be appreciated that a different type of beamforming technique may be used depending on how the microphone is mounted or aligned relative to the user's mouth.

Once the accelerometer output signals and the audio output signals are processed, the communication system 310 of the wearable device 302 is configured to combine the filtered output signals to detect the voice or speech of the user. In other words, the vibrations of user's head and/or neck detected by the accelerometer 326 is correlated to the sound captured by the microphones 324 to improve voice detection accuracy. The combined filtered output signals are transmitted to a destination via wired or wireless communication. The destination may include another wearable device, another vehicle, and/or a software application or a server that is performing the voice recognition.

It should be appreciated that, in some embodiments, the transmission of sound through the user's head may cause distortion in the accelerometer signals at high frequencies and, thus, the audio quality of the accelerometer signals may be more representative at lower frequencies. In such embodiments, the communication system may process accelerometer signals from an accelerometer alone without the audio output signals from the microphone to detect the voice of the user with the lower vocal frequency range, for example, 150 Hz to 1.5 kHz. Additionally, in such embodiments, the method 400 may be performed (i.e., using output signals from the accelerometer and the microphones) to detect a voice of the user with the higher end of the vocal talking range, for example 1.5 kHz to 4 kHz.

Figure 5:
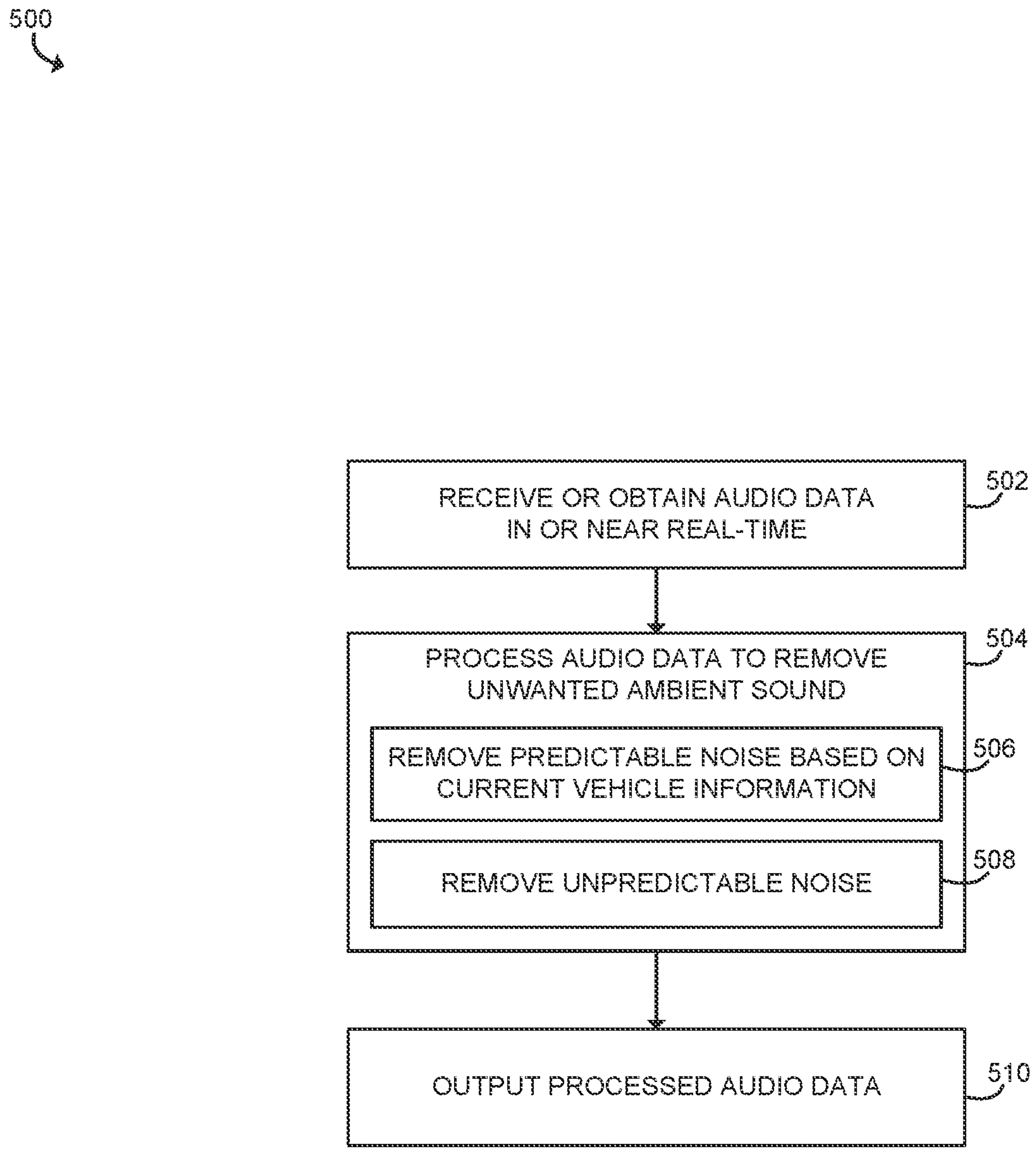
FIG. 5 is a flow diagram illustrating a computer-implemented method for noise cancellation of audio data.

Referring now to FIG. 5, a computer-implemented method 500 for noise cancellations of audio data is shown. In the illustrative embodiment, the method 500 is performed by a communication system (e.g., the communication system 130 of the recreational vehicle 100 or the communication system 130 of the helmet 302). In block 502, the communication system receives or obtains audio data in or near real-time. It should be appreciated that the audio data may be collected via a microphone that is configured to capture a user's voice or speech. In the example of a recreational vehicle 100 shown in FIG. 1, the microphone 118 mounted on the recreational vehicle 100 is configured to capture the voice of a user (e.g., a rider/driver) during a ride of the recreational vehicle 100. Similarly, in the example of a helmet 302 shown in FIG. 3, one or more microphones 324 of the helmet 302, which may be positioned or mounted inside and/or outside of the helmet 302, are configured to capture the voice of a user (e.g., a wearer) during a ride of a recreational vehicle (e.g., the recreational vehicle 100). As such, it is inevitable that the microphones also capture noise (e.g., engine noise, road noise, wind) in addition to the voice of the user.

To reduce unwanted ambient sounds from the audio data captured by a microphone, the communication system is configured to perform noise processing algorithms to remove unwanted ambient sounds from the audio data, as indicated in block 504. The unwanted ambient sounds may be characterized as predictable or unpredictable. The predictable noise may include engine noise that is generated based on a state of an engine of a recreational vehicle that the user is currently riding, while the unpredictable noise may include road noise, wind noise, and/or any other environment noise that is captured during the ride.

In block 506, the communication system removes the predictable noise from the audio data based on the current vehicle information of the recreational vehicle that the user is currently riding. The current vehicle information includes a type/model/make of the recreational vehicle, a vehicle noise profile associated with the recreational vehicle, and current state of the engine of the recreational vehicle in or near real-time. The current state of the engine includes any current state of the engine parameters, such as an engine phase, an engine speed, a transmission gear, a clutch position, a throttle position, and a wheel speed of the recreational vehicle. It should be appreciated that the vehicle noise profile is generated based on known engine parameters (e.g., an engine phase, an engine speed, a transmission gear, a clutch position, a throttle position, and a wheel speed) of the respective or similar recreational vehicle.

In other words, based on the current state of the engine of the recreational vehicle, the communication system may predict what the expected noise is going to be. This allows the communication system to remove sudden noises generated by the vehicle that may not have been otherwise characterized as noise. It should be appreciated that, in the illustrative embodiment, the vehicle noise profile is preloaded on the communication system prior to receiving the audio data. However, in some embodiments, the vehicle noise profile may be obtained in real-time.

Subsequently or simultaneously, in block 508, the communication system also removes the unpredictable noise from the audio data. To do so, for example, the communication system may use a moving average filter by collecting audio data for a predefined period of time and averaging the audio data to determine the noise. For example, the communication system may utilize a 4-second window filter to gather data, compute what the noise is, and remove it from the data collected in the next time window. However, since the noise is determined based on the previous time window, it may not respond to sudden changes (e.g., noise from sudden acceleration). As such, the communication system utilizes the vehicle noise profile to recognize and cancel out those sudden noises generated by the vehicle, as described above. It should be appreciated that, in some embodiments, the communication system may perform block 508 prior to performing block 506.

Once the unwanted ambient sounds have been removed or cancelled from the audio data, the communication system outputs the processed audio data with the user's voice or speech, as indicated in block 510. The improved noise cancellation performance of the communication system allows the user to communication with a recreational vehicle using voice commands. It may also be used for phone conversations and/or long-range radio conversations.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A communication system for noise processing, the communication system comprising:

a processor; and memory comprising instructions that when executed by the processor cause the processor to:

receive audio data including a voice of a user via a microphone;

process the audio data to remove unwanted ambient sound using both of the following separate and distinct operations:

(a) removing predictable noise from the audio data based on current vehicle information of a recreational vehicle of the user, wherein the current vehicle information includes a vehicle noise profile generated based on engine parameters; and (b) removing unpredictable noise from the audio data based on environmental conditions, wherein the removing of unpredictable noise is performed independently of the removing of predictable noise; and output processed audio data.

2. The communication system of claim 1, wherein the unwanted ambient sound includes predictable noise, and wherein the predictable noise includes engine noise that is generated based on a state of an engine of the recreational vehicle that the user is riding.

3. The communication system of claim 1, wherein the unpredictable noise includes road noise, wind noise, and/or any other environment noise.

4. The communication system of claim 1, wherein the microphone is mounted on the recreational vehicle.

5. The communication system of claim 1, wherein the microphone is mounted on a wearable device of the user.

6. The communication system of claim 1, wherein to process the audio data comprises to remove a first set of noise from the audio data based on the current vehicle information, wherein the current vehicle information includes a type, model, and/or make of the recreational vehicle, a vehicle noise profile associated with the recreational vehicle, and/or a current state of an engine of the recreational vehicle.

7. The communication system of claim 6, wherein the current state of an engine of the recreational vehicle includes any current state of engine parameters, and the vehicle noise profile is generated based on the engine parameters of the recreational vehicle.

8. The communication system of claim 7, wherein the engine parameters include an engine phase, an engine speed, a transmission gear, a clutch position, a throttle position, and a wheel speed.

9. The communication system of claim 1, wherein to process the audio data comprises to remove a second set of noise from the audio data using a moving average filter.

10. A method for noise processing, the method comprising:

receiving audio data including a voice of a user via a microphone;

processing the audio data to remove unwanted ambient sound using both of the following separate and distinct operations:

(a) removing predictable noise from the audio data based on current vehicle information of a recreational vehicle of the user, wherein the current vehicle information includes a vehicle noise profile generated based on engine parameters; and (b) removing unpredictable noise from the audio data based on environmental conditions, wherein the removing of unpredictable noise is performed independently of the removing of predictable noise; and outputting processed audio data.

11. The method of claim 10, wherein the unwanted ambient sound includes predictable noise, and wherein the predictable noise includes engine noise that is generated based on a state of an engine of the recreational vehicle that the user is riding.

12. The method of claim 10, wherein the unpredictable noise includes road noise, wind noise, and/or any other environment noise.

13. The method of claim 10, wherein the microphone is mounted on the recreational vehicle.

14. The method of claim 10, wherein the microphone is mounted on a wearable device of the user.

15. The method of claim 10, wherein processing the audio data comprises removing a first set of noise from the audio data based on the current vehicle information, wherein the current vehicle information includes a type, model, and/or make of the recreational vehicle, a vehicle noise profile associated with the recreational vehicle, and/or a current state of an engine of the recreational vehicle.

16. The method of claim 15, wherein the current state of an engine of the recreational vehicle includes any current state of engine parameters, and the vehicle noise profile is generated based on the engine parameters of the recreational vehicle.

17. The method of claim 16, wherein the engine parameters include an engine phase, an engine speed, a transmission gear, a clutch position, a throttle position, and a wheel speed.

18. The method of claim 10, wherein processing the audio data comprises removing a second set of noise from the audio data using a moving average filter.

19. A recreational vehicle comprising:

a frame;

front and rear ground-engaging members supporting the frame;

a powertrain drivingly coupled to one of the front and rear ground-engaging members;

a steering assembly coupled to the front ground-engaging member for steering the recreational vehicle;

a seat supported by the frame; and a communication system having a microphone positioned between the seat and the steering assembly, the communication system comprising a processor and memory storing instructions that, when executed by the processor, cause the communication system to perform a set of operations comprising:
receiving audio data, including a voice of a user, via the microphone;
processing the audio data to remove unwanted ambient sound using both of the following separate and distinction operations;
(a) removing predictable noise from the audio data based on current vehicle information of the recreational vehicle of the user, wherein the current vehicle information includes a vehicle noise profile generated based on engine parameters; and
(b) removing unpredictable noise from the audio data based on environmental conditions, wherein the removing of unpredictable noise is performed independently of the removing of the predictable noise; and
outputting the processed audio data.

20. The recreational vehicle of claim 19, further comprising a fuel tank supported by the frame and positioned between the seat and the steering assembly, wherein the microphone is mounted on top of the fuel tank.

21. The recreational vehicle of claim 19, further comprising an airbox supported by the frame and positioned between the seat and the steering assembly, wherein the microphone is mounted on top of the airbox.

22. The recreational vehicle of claim 19, wherein the communication system is configured to receive a voice of a user of the recreational vehicle via the microphone.

23. The recreational vehicle of claim 19, wherein the steering assembly further includes a front fairing and user grips, the microphone is positioned behind the front fairing and below the user grips to reduce an amount of wind that comes in contact with the microphone.

24. The recreational vehicle of claim 19, wherein the microphone is mounted in an angle, facing upwardly toward a user of the recreational vehicle, to reduce an amount of exhaust noise and/or engine noise.

* * * * *